(12) United States Patent
Weirauch

(10) Patent No.: US 7,042,372 B2
(45) Date of Patent: May 9, 2006

(54) ENCODING INFORMATION IN CODES IDENTIFYING BEGINNING OF REGIONS OF DATA

(75) Inventor: Charles R. Weirauch, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/285,872

(22) Filed: Oct. 31, 2002

(65) Prior Publication Data

US 2004/0085229 A1 May 6, 2004

(51) Int. Cl.
*H03M 7/34* (2006.01)
*H03M 7/38* (2006.01)

(52) U.S. Cl. .......................................................... 341/51
(58) Field of Classification Search .................. 341/58, 341/59, 51, 69, 143, 118; 235/494; 360/51; 369/47.54, 59.12, 275.2, 275.3, 47.24, 59.13, 369/59.25, 253; 375/253; 382/100; 386/46; 714/752, 769, 814; 705/57; 380/255
See application file for complete search history.

(56) References Cited

U.S. PATENT DOCUMENTS

| | | | | | |
|---|---|---|---|---|---|
| 5,365,382 | A | * | 11/1994 | Weng et al. | 360/51 |
| 5,572,010 | A | * | 11/1996 | Petrie | 235/494 |
| 5,760,717 | A | * | 6/1998 | Scholz | 341/59 |
| 5,946,443 | A | * | 8/1999 | Oh | 386/46 |
| 5,987,066 | A | * | 11/1999 | Kojima et al. | 375/253 |
| 6,091,698 | A | * | 7/2000 | Hogan | 369/275.2 |
| 6,195,778 | B1 | * | 2/2001 | Tran | 714/752 |
| 6,233,213 | B1 | * | 5/2001 | Okada et al. | 369/59.12 |
| 6,249,896 | B1 | * | 6/2001 | Ho et al. | 714/814 |
| 6,296,192 | B1 | * | 10/2001 | Hecht | 235/494 |
| 6,487,155 | B1 | * | 11/2002 | Carson et al. | 369/59.13 |
| 6,507,299 | B1 | * | 1/2003 | Nuijten | 341/143 |
| 6,604,219 | B1 | * | 8/2003 | Lee et al. | 714/769 |
| 6,606,038 | B1 | * | 8/2003 | Immink et al. | 341/59 |
| 6,721,251 | B1 | * | 4/2004 | Kojima et al. | 369/47.54 |
| 6,785,401 | B1 | * | 8/2004 | Walker et al. | 382/100 |

* cited by examiner

*Primary Examiner*—Patrick Wamsley
(74) *Attorney, Agent, or Firm*—Augustus W. Winfield

(57) ABSTRACT

Digital data is embedded in codes used to identify beginnings of regions of modulated data bit streams. Data may be designated by a choice of one code from a plurality of alternative codes, or data may be designated by a variable field within a code.

1 Claim, 4 Drawing Sheets

US 7,042,372 B2

ENCODING INFORMATION IN CODES IDENTIFYING BEGINNING OF REGIONS OF DATA

FIELD OF INVENTION

This invention relates generally to digital data transmission and recording.

BACKGROUND

There is a need for embedding data within other data. For example, for copy protection of entertainment content on digital media, there is a need to distribute decryption keys and copy control information along with the entertainment content. Decryption keys and copy control information may be recorded in reserved areas of a medium. Reserved areas may preempt space that could otherwise be used for user data. Alternatively, copy control information may be embedded within the entertainment content in the form of a digital watermark. Digital watermarks modify the original data.

U.S. Pat. No. 5,699,434 (Hogan), and divisions of that patent (U.S. Pat. No. 5,828,754, U.S. Pat. No. 6,278,386, and U.S. patent application Ser. No. 09/855,889) disclose multiple ways of embedding data into encoded data in ways that do not modify the original data, and in ways that do not reduce the capacity for recording original data.

There is an ongoing need for additional methods of embedding data within other data without reducing or altering user data.

SUMMARY

Digital data is embedded in codes used to identify beginnings of regions of modulated data bit streams. In example embodiments, data is designated by a choice of one code from a plurality of alternative codes. In one example embodiment, data is designated by a variable field within a code.

DETAILED DESCRIPTION OF EXAMPLE EMBODIMENTS OF THE INVENTION

Transmitted digital data, and data recorded on digital media, is commonly encoded in a manner that satisfies multiple constraints imposed by signal detecting electronics, particularly constraints on the minimum and maximum number of consecutive binary zeros in the encoded data, and constraints on low frequency content in a modulated data bit stream. Typically, the original data is divided into symbols, where a symbol is a small fixed number of bits. Typically, each symbol is used as an index into a look-up table containing bit patterns (codes, or sometimes called channel bits) that satisfy the various constraints. For some encoding systems, there are multiple choices for codes for each symbol, and it is common for the choices to made based on controlling the low frequency content in the encoded data.

In a modulated stream of ones and zeros, decoders need a periodic alignment method to accurately begin the transformation from modulated bits to user data bits. It is known to use a unique pattern of bits, typically referred to as a synchronization code or synchronization field, to provide this periodic alignment. The pattern of bits in a synchronization code is typically easily detected and distinguished from encoded user data by including a sequence of bits that violate data encoding requirements. For example, data may have an encoding requirement that there cannot be more than ten consecutive zeros in the encoded data, and a synchronization code may be distinguished and detected by having more than ten consecutive zeros.

For a specific example, DVD optical disks have binary bit patterns called SYNC Codes that provide known patterns for detector electronics, identifying the beginning of regions of data. Specifically, for DVD optical disks, 2,048 bytes of unencoded user data, plus 16 bytes of overhead data, are encoded into a Data Frame. An ECC Block comprises 16 scrambled Data Frames logically formatted into rows, plus row and column ECC data. An ECC Block is logically divided into 16 Physical Sectors, where each logically formatted row of a Physical Sector is divided into two Sync Frames. Each Sync Frame comprises a 32-bit SYNC Code, followed by 1,456 bits of encoded data. Each SYNC Code contains a code violation of 13 consecutive binary ZERO's, whereas encoded data has a constraint of a minimum of two consecutive binary ZERO's and a maximum of 10 consecutive binary ZERO's between binary ONE's.

Figure 1A:
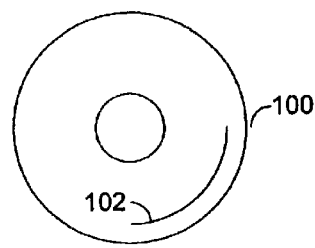
FIG. 1A is a block diagram of an optical disk suitable for use with a first example embodiment.
Figure 1B:
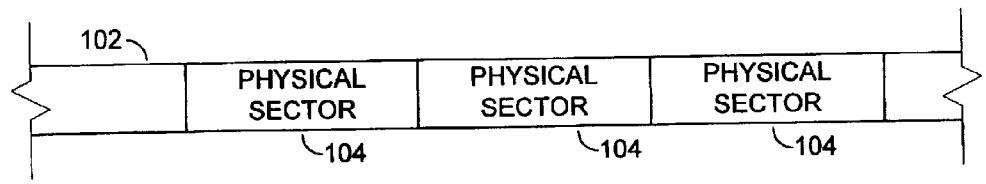
FIG. 1B is a block diagram illustrating additional detail for a track illustrated in FIG. 1A.
Figure 1C:
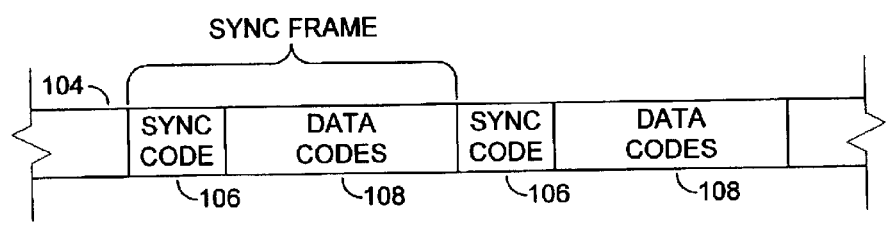
FIG. 1C is a block diagram illustrating additional detail for a physical sector illustrated in FIG. 1B.

FIG. 1A illustrates an optical disk 100, and a portion of a spiral data track 102. FIG. 1B illustrates that track 102 is divided into Physical Sectors 104. FIG. 1C illustrates that Physical Sectors 104 further comprise Sync Frames, where each Sync Frame comprises a 32-bit SYNC Code 106, followed by 1,456 bits of encoded data 108.

In present DVD standards, there are 16 different SYNC Codes, logically divided into eight pairs. One pair, out of eight pairs, of SYNC Codes is designated for each SYNC Code location within a Physical Sector. At each SYNC Code location within a Physical Sector, one of two alternate SYNC Codes for that location is selected, with the selection based on minimizing low frequency content. In various example embodiments of the invention, SYNC Codes are selected to designate binary data.

Figure 2:
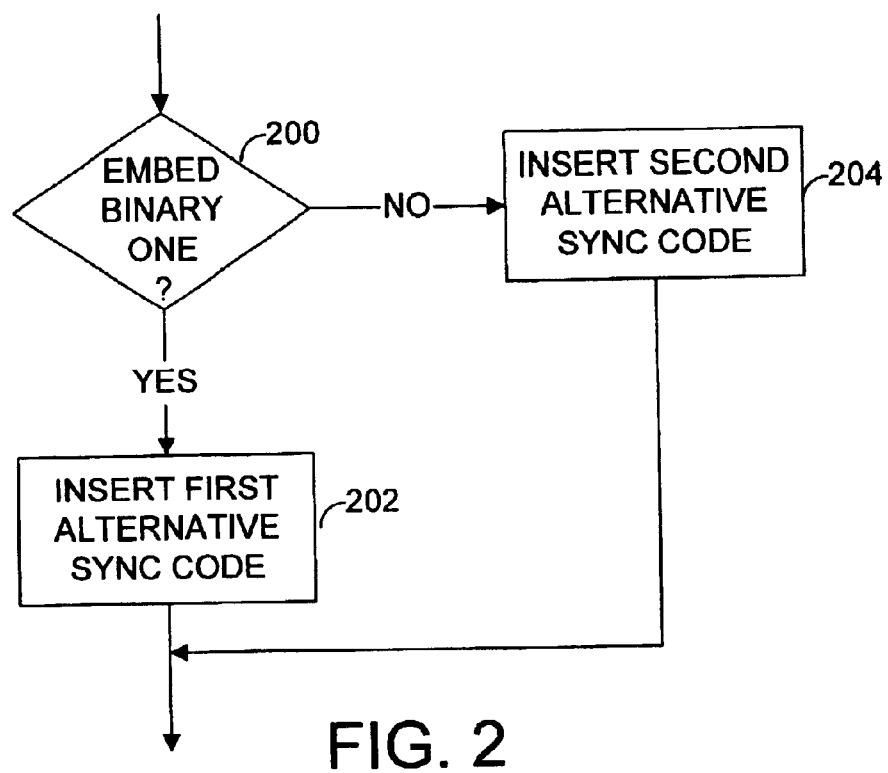
FIG. 2 is a flow chart of a first example embodiment of a method of embedding data.

FIG. 2 illustrates a first example embodiment, in which if there are two alternative SYNC Codes for a location within a Physical Sector, one alternative may represent a binary ONE, and the other alternative may represent a binary ZERO. In FIG. 2, at step 200, if a binary ONE is to be embedded, then at step 202 a first alternative SYNC Code is inserted into the appropriate location in a Physical Sector. Otherwise, at step 204, a second alternative SYNC Code is inserted into the appropriate location in the Physical Sector.

Figure 3:
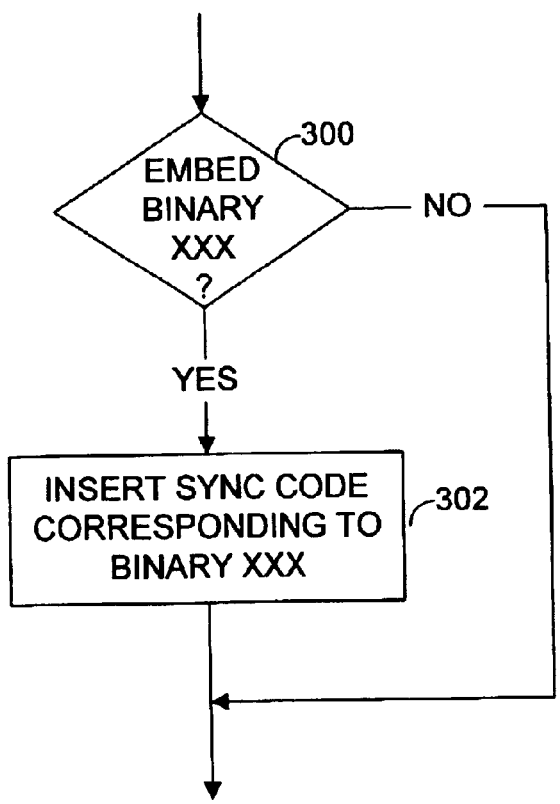
FIG. 3 is a flow chart of a second example embodiment of a method of embedding data.

FIG. 3 illustrates a second example embodiment, in which more than two alternatives may be provided for SYNC Codes for each SYNC Code location within a Physical Sector. For example, if four alternatives are provided for each SYNC Code location, then each alternative can represent two bits (00, 01, 10, 11). In FIG. 3, at step 200, if binary digits XXX are to be embedded, then at step 302 a SYNC Code alternative corresponding to binary XXX is inserted into the appropriate location in a Physical Sector.

Figure 4:
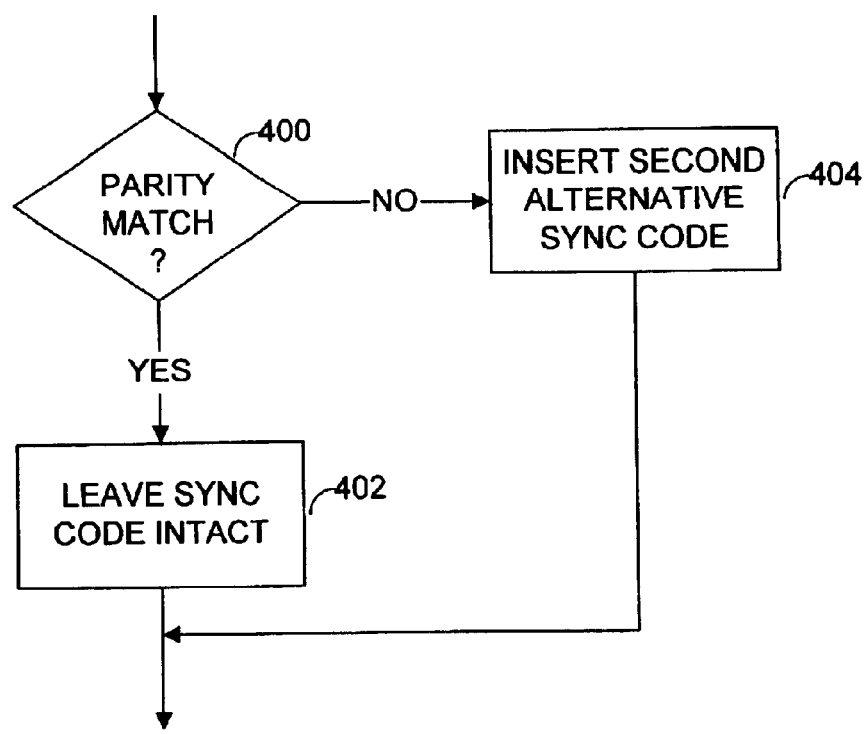
FIG. 4 is a flow chart of a third example embodiment of a method of embedding data.

FIG. 4 illustrates a third example embodiment, in which data may be encoded in the parity of a segment of a stream of bits that includes at least one SYNC Code. In present DVD standards, if one alternative SYNC Code for each location in a Physical Sector contains an even number of binary ONE's, the other alternative SYNC Code for the location contains an odd number of binary ONE's. Accordingly, in a segment of a stream of bits that includes at least one SYNC code, the parity of the bit stream can be controlled by selection of at least one SYNC Code. For example, one bit of information can be embedded in a Sync Frame by making the parity of the Sync Frame even or odd. In FIG. 4, at step 400, if the parity of a segment of a bit stream containing a SYNC Code matches a parity corresponding to a desired bit, then at step 402 the SYNC Code is left intact. Otherwise, at step 404 an alternative SYNC Code is inserted at the appropriate location within the Physical Frame, thereby changing the parity of the segment of the bit stream.

Figure 5:
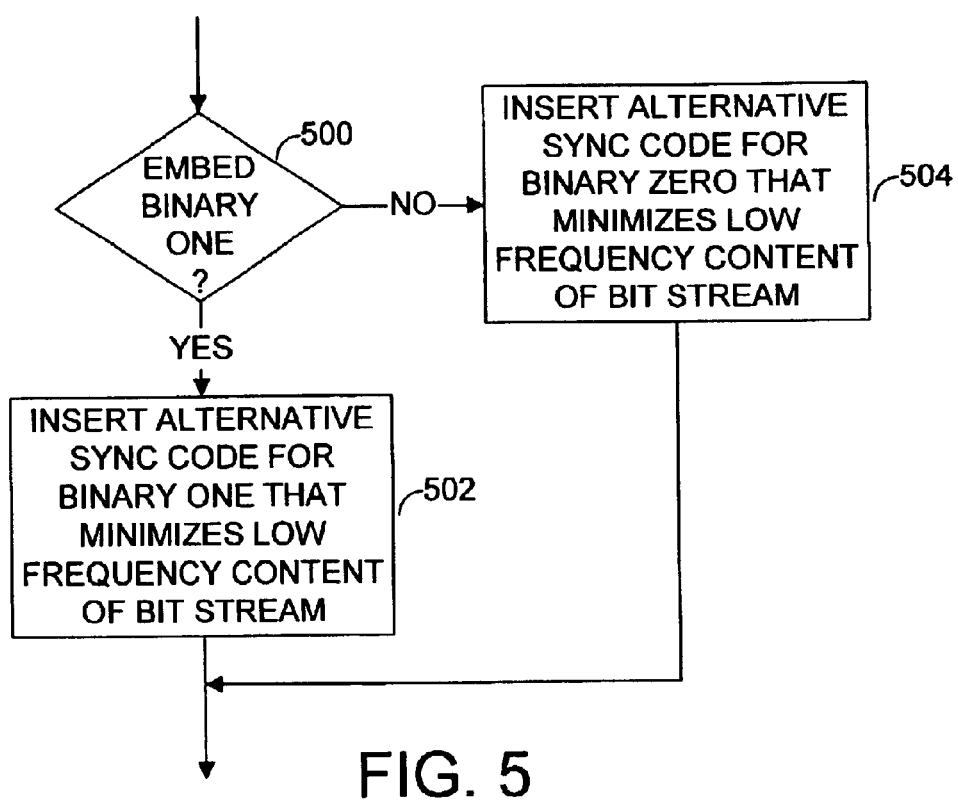
FIG. 5 is a flow chart of a fourth example embodiment of a method of embedding data.

In the first three example embodiments, the impact of a SYNC Code selection on low frequency content of a bit stream is ignored. FIG. 5 illustrates a fourth example embodiment, in which more than two alternative SYNC Codes may be provided for each binary value. Given a requirement for a particular binary value, the alternative that provides the least low frequency content may be selected. In FIG. 5, at step 500, if a binary ONE is to be embedded, then at step 502 one SYNC Code is selected from multiple alternative SYNC Codes for a binary ONE, based on which alternative provides the least low frequency content for a bit stream over which low frequency content is measured. Otherwise, at step 504 one SYNC Code is selected from multiple alternative SYNC Codes for a binary ZERO, based on which alternative provides the least low frequency content for a bit stream over which low frequency content is measured.

If a value of +1 is assigned to one state of a binary signal, and if a value of −1 is assigned to the opposite state, a running sum of these values (or the area under the curve) is a measure of the low frequency content of the signal. The running sum is called Digital Sum Variance (DSV). For DVD, DSV may be controlled over multiple ECC blocks. SYNC Codes may be first inserted with an arbitrary choice of alternatives for multiple ECC blocks, and then replaced by SYNC Codes that provide the same embedded data but reduce the peak absolute value of DSV within the multiple ECC blocks. Alternatively, as each SYNC Code is inserted, a SYNC Code can be selected from multiple alternative SYNC Codes, each having the same embedded data value, based on minimizing the absolute value of DSV as measured at the end of the newly inserted SYNC Code.

Figure 6:
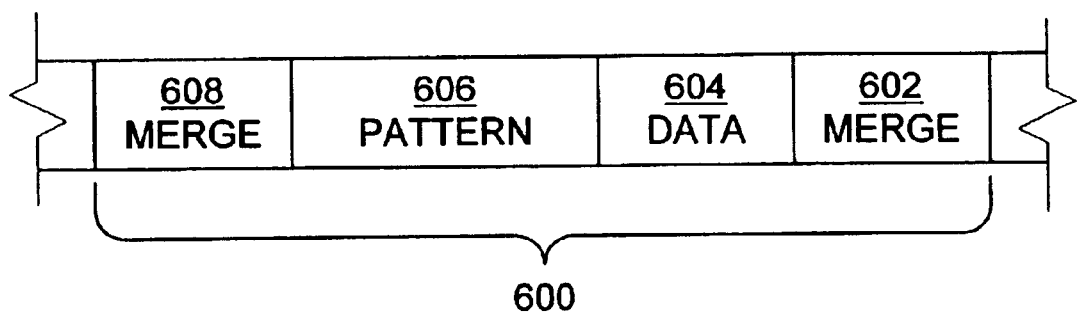
FIG. 6 is a block diagram of an example synchronization field suitable for use with a fifth example embodiment.

FIG. 6 illustrates a fifth example embodiment. A SYNC Code 600 comprises multiple fields, 602–608. Field 604 is variable, and is used for encoding data. Field 604 may be a single bit, or may be multiple bits. Field 606 includes a pattern that is distinctive for identifying a SYNC field. For example, bits within field 606 may intentionally violate the encoding requirements for data (for example, too many consecutive ZERO's), so that field 606 can be detected and distinguished from data.

In the following discussion, for purposes of illustration only, assume that the bit stream in which SYNC Code 600 is included is read from right to left. That is, field 602 is read first, then field 604, then field 606, and then field 608. In Compact Disks (CD), it is possible that when data codes are concatenated, the bits at the end of one code and the bits at the beginning of the next code may violate various encoding requirements. Accordingly, in CD formats, variable bits (called merge bits) are computed and inserted between predefined codes to ensure that encoding requirements are satisfied. In present DVD standards, predefined data codes and SYNC Codes are specified so that they can be concatenated in any order, and the bits at the end of one code and the bits at the beginning of the next code satisfy various encoding requirements. In FIG. 6, Since field 604 is variable, the bits in field 602 may also need to be variable, similar in function to the merge bits used in CD formats, to ensure that encoding requirements, including low frequency content, are satisfied. Field 604 may be dependent on bits at the end of the previous field and the bit(s) in field 604. Similarly, field 608 may need to be variable, and may be dependent on the bit(s) in field 604 and the bits at the beginning of the next field.

Present DVD formats provide 4.7 gigabytes of user data, and approximately 60 million SYNC Codes, on each data layer. In the various example embodiments, at least one bit is defined by one SYNC Code. If one bit is defined by each SYNC Code, then over seven megabytes of data can be embedded into the SYNC Codes of the user data area for one DVD data layer, without reducing the capacity for user data, and without changing the user data. There are additional areas defined for non-user-data that also include SYNC Codes.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method, comprising:
    selecting a code for inclusion in digital data being transmitted or being recorded on digital media, the code satisfying three criteria as follows: (1) designating a beginning of a region of user data without modifying the user data, (2) keeping low-frequency content of the digital data within a specified limit, and (3) designating at least one bit of information other than location of the code, and information other than low-frequency control.

* * * * *